US011679367B2

(12) United States Patent
Biesheuvel et al.

(10) Patent No.: US 11,679,367 B2
(45) Date of Patent: Jun. 20, 2023

(54) SYSTEMS AND PROCESSES FOR IMPROVING HYDROCARBON UPGRADING

(71) Applicant: Dow Global Technologies LLC, Midland, MI (US)

(72) Inventors: Cornelis Biesheuvel, Hoek (NL); Wim M. Kamperman, Middleburg (NL)

(73) Assignee: Dow Global Technologies LLC, Midland, MI (US)

( * ) Notice: Subject to any disclaimer, the term of this patent is extended or adjusted under 35 U.S.C. 154(b) by 0 days.

(21) Appl. No.: 17/271,714

(22) PCT Filed: Aug. 20, 2019

(86) PCT No.: PCT/US2019/047218
§ 371 (c)(1),
(2) Date: Feb. 26, 2021

(87) PCT Pub. No.: WO2020/046638
PCT Pub. Date: Mar. 5, 2020

(65) Prior Publication Data
US 2021/0316262 A1    Oct. 14, 2021

Related U.S. Application Data

(60) Provisional application No. 62/725,807, filed on Aug. 31, 2018.

(51) Int. Cl.
*B01J 19/24*    (2006.01)
*B01J 3/04*     (2006.01)
*C10G 9/24*     (2006.01)

(52) U.S. Cl.
CPC .............. *B01J 3/04* (2013.01); *B01J 19/24* (2013.01); *C10G 9/24* (2013.01);
(Continued)

(58) Field of Classification Search
CPC ...... B01J 19/24; B01J 19/242; B01J 19/2425; B01J 3/04; B01J 3/046; B01J 2219/00135;
(Continued)

(56) References Cited

U.S. PATENT DOCUMENTS 1,327,023 A    1/1920    Cherry
1,860,322 A    5/1932    Carter
(Continued)

FOREIGN PATENT DOCUMENTS

CN    1033641 A    7/1989
CN    1308561 A    8/2001
(Continued)

OTHER PUBLICATIONS

Ismael Amghizar, et. al., New Trends in Olefin Production, Elsevier, Engineering 3 (217) 171-178.
(Continued)

*Primary Examiner* — Lessanework Seifu
(74) *Attorney, Agent, or Firm* — Dinsmore & Shohl LLP

(57) ABSTRACT

A reactor system for thermally treating a hydrocarbon-containing stream, that includes a pressure containment vessel comprising an interior chamber and a heat transfer medium that converts electrical current to heat and is positioned within the interior chamber of the pressure containment vessel, wherein the heat transfer medium comprises a first end face, a second end face, and channels extending between the first end face and the second end face. A process for thermally treating a hydrocarbon-containing stream includes introducing the hydrocarbon-containing stream into the reactor system, pressurizing the pressure containment vessel and the heat transfer medium without heating the pressure containment vessel or the heat transfer medium, supplying electrical current to the heat transfer
(Continued)

medium, converting the electrical current to heat, heating the hydrocarbon-containing stream, and converting the hydrocarbon-containing stream to an effluent stream.

20 Claims, 2 Drawing Sheets

(52) U.S. Cl.
CPC .............. *B01J 2219/00074* (2013.01); *B01J 2219/00135* (2013.01); *B01J 2219/00162* (2013.01); *C10G 2300/4043* (2013.01); *C10G 2300/708* (2013.01); *C10G 2400/20* (2013.01); *C10G 2400/22* (2013.01); *C10G 2400/30* (2013.01)

(58) Field of Classification Search
CPC ...... B01J 2219/2416; B01J 2219/00074; B01J 2219/00162; C10G 9/24
See application file for complete search history.

(56) References Cited

U.S. PATENT DOCUMENTS

| | | | |
|---|---|---|---|
| 3,546,316 A | 12/1970 | Koszman | |
| 3,641,183 A | 2/1972 | Cahn et al. | |
| 5,321,191 A | 6/1994 | Alagy et al. | |
| 2004/0016650 A1* | 1/2004 | Klug | C01B 3/384 205/343 |
| 2006/0116543 A1 | 6/2006 | Bellet et al. | |
| 2017/0022429 A1* | 1/2017 | Van Willigenburg | C07C 5/327 |
| 2017/0106360 A1* | 4/2017 | Meriam | B01J 35/0033 |
| 2021/0113983 A1* | 4/2021 | Mortensen | C01C 3/0208 |

FOREIGN PATENT DOCUMENTS

| | | | |
|---|---|---|---|
| CN | 102256693 A | 11/2011 | |
| CN | 102264873 A | 11/2011 | |
| CN | 105688770 A | 6/2016 | |
| CN | 105874088 A | 8/2016 | |
| CN | 108136353 A | 6/2018 | |
| DE | 3929413 A1 | 3/1991 | |
| EP | 542597 A1 | 5/1993 | |
| GB | 1237768 A | 6/1971 | |
| GB | 1338352 A | 11/1973 | |
| WO | WO 96/15983 | * | 5/1996 |
| WO | 2010070195 A2 | 6/2010 | |
| WO | 2013135667 A1 | 9/2013 | |

OTHER PUBLICATIONS

S.M. Sadrameli, Thermal/Catalytic cracking of hydrocarbons for the production of olefins: A state-of-the-art review 1 : thermal cracking review, Elsevier, Fuel 140 (2015) 102-115.
Schietekat, et al., Computational Fluid Dynamics-Based Design of Finned Steam Cracking Reactors; DOI 10.1002/aic.14326.
Laurien A. Vandewalle, et. al.,Dynamic simulation of fouling in steam cracking reactors using CFD; Chemical Engineering Journal 329 (2017) 77-87.
International Search Report and Written Opinion pertaining to PCT/US2019/047218, dated Nov. 5, 2019.
International Search Report and Written Opinion pertaining to PCT/US2019/047221, dated Oct. 2, 2019.
International Search Report and Written Opinion pertaining to PCT/US2019/048566, dated Nov. 12, 2019.
Chinese Office Action dated May 25, 2022, pertaining to CN Patent Application No. 201980049690.0, 17 pgs.
Office Action dated Dec. 14, 2022, pertaining to CN Patent Application No. 201980049690.0, 9 pgs.
Translation of Chinese Office Action dated Jul. 21, 2022, pertaining to CN Patent Application No. 201980049690.0, 10 pgs.
Translation of Chinese Office Action dated Sep. 1, 2022, pertaining to CN Patent Application No. 201980049714.2, 7 pgs.
Chinese Office Action dated Mar. 27, 2023, pertaining to Chinese Patent Application No. 201980049981.X, 12 pgs.

* cited by examiner

US 11,679,367 B2

SYSTEMS AND PROCESSES FOR IMPROVING HYDROCARBON UPGRADING

CROSS-REFERENCE TO RELATED APPLICATIONS

This application is a National Stage Entry under 35 U.S.C. § 371 of International Patent Application No. PCT/US2019/047218, filed on Aug. 20, 2019, which claims priority to U.S. Provisional Patent Application No. 62/725,807, filed on Aug. 31, 2018, the entire disclosures of which are hereby incorporated by reference.

BACKGROUND

Field

The present specification generally relates to systems and processes for converting a hydrocarbon-containing stream to desired products while minimizing carbon dioxide ($CO_2$) emissions through the use of electrical current. In particular, the present specification relates to systems and processes that use a heat transfer medium that converts electrical current to heat to heat the hydrocarbon-containing stream.

Technical Background

Feedstock ethane, propane, butane, naphtha, and other hydrocarbons must be upgraded before they can be used as a commercially valuable product, such as hydrogen, olefins, and aromatic hydrocarbons. This upgrading process conventionally utilizes a reactor system in which combustion—such as, for example, combustion of methane—is used to heat the contents of a pressure containment vessel. The combustion furnace of conventional reactor systems produces additional $CO_2$ emissions. A hydrocarbon-containing stream flows through tubular reactors disposed within the pressure containment vessel, and the tubular reactors heat the hydrocarbon-containing stream diluting it with steam, converting the hydrocarbon-containing stream to an effluent stream comprising desired products. However, the tubular reactors of the conventional system are prone to coke formation due to both temperature and negative catalytic influence. In turn, this leads to decreased production time, as the reactor must be shut down to be de-coked. Over time, the coke deposition will degrade the metal surfaces of conventional tubular reactors, leading to a loss of structural integrity and decommissioning of the tubular reactor.

Accordingly, a need exists for systems and processes for converting hydrocarbon-containing streams to desired products while reducing $CO_2$ emissions, such as those produced by conventional combustion systems and processes, and catalytic coke formation.

SUMMARY

According to one embodiment of the present disclosure, a reactor system for thermally treating a hydrocarbon-containing stream comprises: a pressure containment vessel comprising an interior chamber defined by a first end, a second end, and at least one side wall extending from the first end to the second end; and a heat transfer medium that converts electrical current to heat and is positioned within the interior chamber of the pressure containment vessel, wherein the heat transfer medium comprises a first end face, a second end face, and channels extending between the first end face and the second end face.

According to another embodiment of the present disclosure, a process for thermally treating a hydrocarbon-containing stream comprises: introducing the hydrocarbon-containing stream into channels of a heat transfer medium, wherein the heat transfer medium is positioned within an interior chamber of a pressure containment vessel; pressurizing the pressure containment vessel and the heat transfer medium without heating the pressure containment vessel or the heat transfer medium; supplying electrical current to the heat transfer medium; converting the electrical current to heat, thereby increasing the temperature of the heat transfer medium, heating the hydrocarbon-containing stream within the channels of the heat transfer medium; converting the hydrocarbon-containing stream to an effluent stream within the channels of the heat transfer medium, and removing the effluent stream from the channels of the heat transfer medium.

Additional features and advantages will be set forth in the detailed description which follows, and in part will be readily apparent to those skilled in the art from that description or recognized by practicing the embodiments described herein, including the detailed description which follows, the claims, as well as the appended drawings.

It is to be understood that both the foregoing general description and the following detailed description describe various embodiments and are intended to provide an overview or framework for understanding the nature and character of the claimed subject matter. The accompanying drawings are included to provide a further understanding of the various embodiments, and are incorporated into and constitute a part of this specification. The drawings illustrate the various embodiments described herein, and together with the description serve to explain the principles and operations of the claimed subject matter.

DETAILED DESCRIPTION

Figure 1:
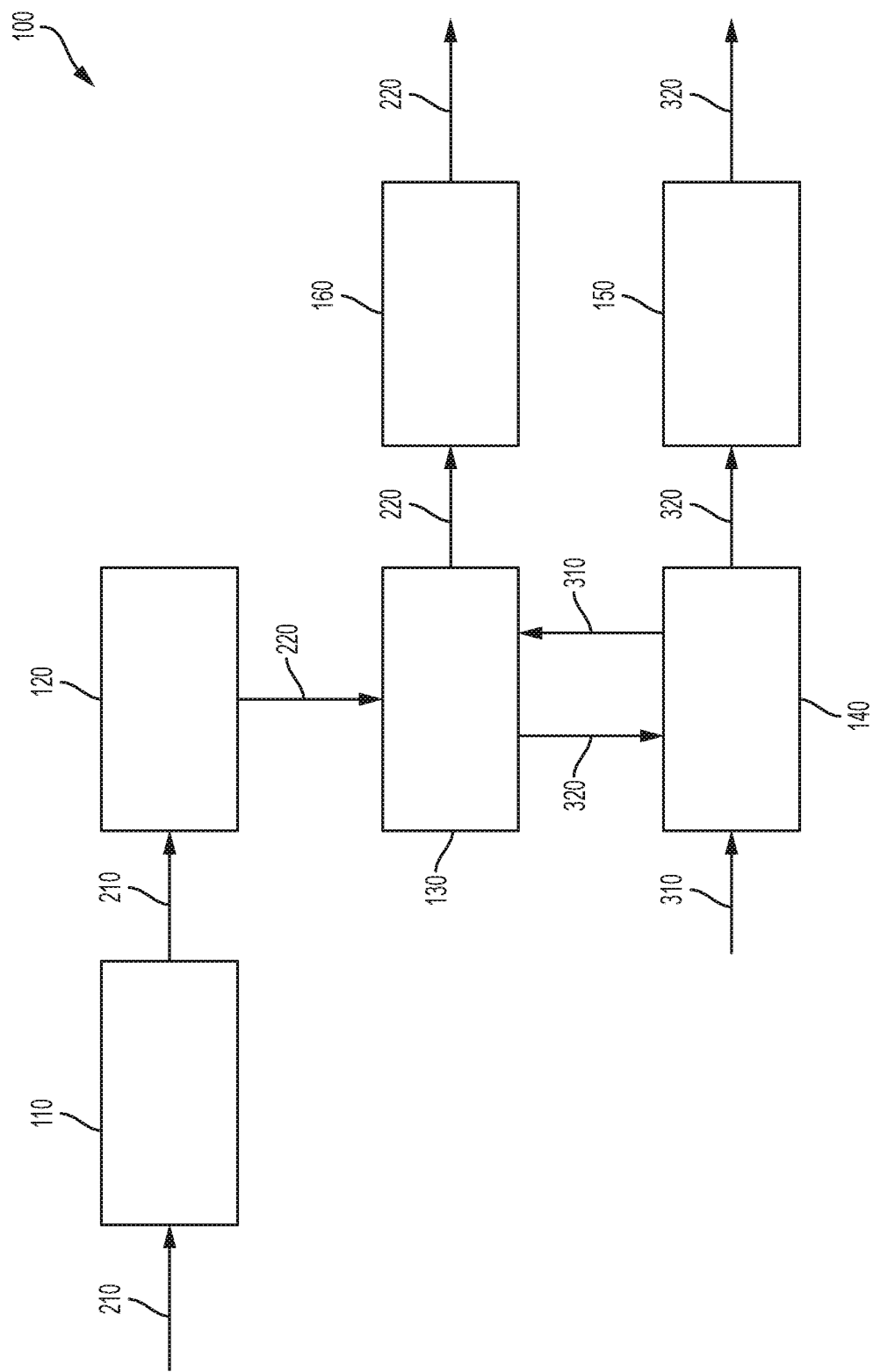
FIG. 1 schematically depicts a first embodiment of a system and process for converting hydrocarbon-containing streams to desired products according to embodiments disclosed and described herein.

Reference will now be made in detail to embodiments of systems and processes for converting hydrocarbon-containing streams to desired products, such as, for example, at least one of hydrogen, olefins, or aromatic hydrocarbons, embodiments of which are illustrated in the accompanying drawings. Whenever possible, the same reference numerals will be used throughout the drawings to refer to the same or like parts.

In one embodiment, a reactor system for thermally treating a hydrocarbon-containing stream comprises: a pressure containment vessel comprising an interior chamber defined by a first end, a second end, and at least one side wall extending from the first end to the second end; and a heat transfer medium that converts electrical current to heat and is positioned within the interior chamber of the pressure containment vessel, wherein the heat transfer medium comprises a first end face, a second end face, and channels extending between the first end face and the second end face.

In another embodiment, a process for thermally treating a hydrocarbon-containing stream comprises: introducing the hydrocarbon-containing stream into channels of a heat transfer medium, wherein the heat transfer medium is positioned within an interior chamber of a pressure containment vessel; pressurizing the pressure containment vessel and the heat transfer medium without heating the pressure containment vessel or the heat transfer medium; supplying electrical current to the heat transfer medium; converting the electrical current to heat, thereby increasing the temperature of the heat transfer medium, heating the hydrocarbon-containing stream within the channels of the heat transfer medium; converting the hydrocarbon-containing stream to an effluent stream within the channels of the heat transfer medium, and removing the effluent stream from the channels of the heat transfer medium.

With reference now to FIG. 1, an embodiment of system for converting hydrocarbon-containing streams to desired products is provided. It should be understood that the embodiment depicted in FIG. 1 is exemplary and does not limit the scope of this disclosure. As shown in the embodiment depicted in FIG. 1, a system 100 for converting a hydrocarbon-containing stream 210 to an effluent stream 220 that comprises desired products includes, in series and/or in parallel, a heat exchanger 110, a pressure containment vessel 120, a quench exchanger 130, a coolant drum 140, a superheater 150, and a second heat exchanger 160. It should be understood that according to various embodiments, the system 100 may include various combinations of the above-listed components of the system 100. Furthermore, the system 100 may comprise one or more heat exchangers, which may be thermally coupled to one another. The system 100 may further comprise one or more superheaters 150, in series and/or in parallel.

Figure 2:
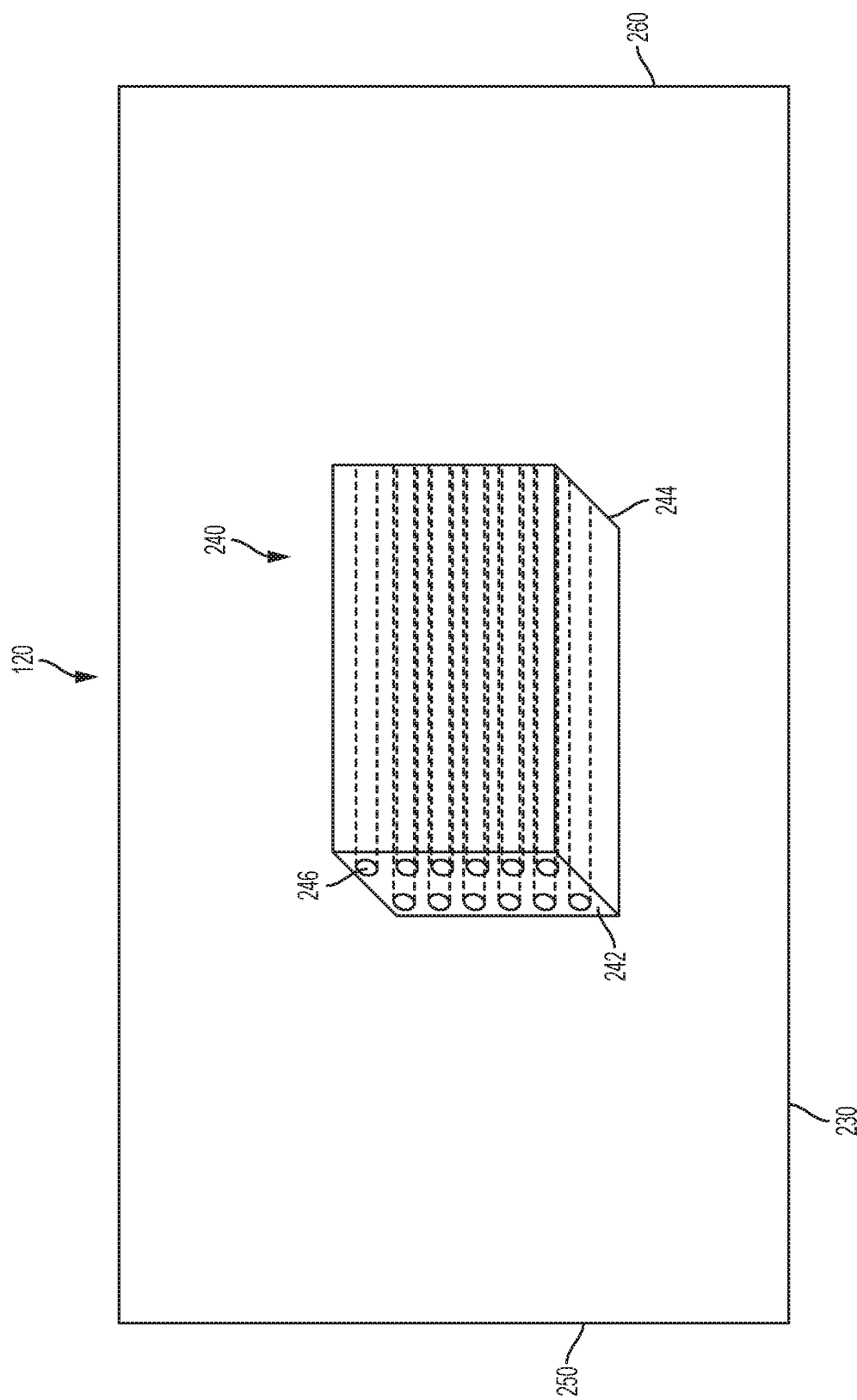
FIG. 2 schematically depicts a pressure containment vessel and its components according to embodiments disclosed and described herein.

According to the embodiment shown in FIG. 2, the pressure containment vessel 120 comprises an interior chamber and a heat transfer medium 240. The interior chamber of the pressure containment vessel 120 is defined by a first end 250, a second end 260, and at least one side wall 230 extending from the first end 250 to the second end 260. The heat transfer medium 240 converts electrical current to heat and is positioned within the interior chamber of the pressure containment vessel 120. As shown in the embodiment depicted in FIG. 2, the heat transfer medium 240 comprises a first end face 242, a second end face 244, and channels 246 extending between the first end face 242 and the second end face 244. The second end face 244 may be placed against the second end 260 to avoid mixing the hydrocarbon-containing stream 210 and the effluent stream 220. The channels 246 of the heat transfer medium 240 may be fluidly coupled to the interior chamber of the pressure containment vessel 120. The mechanism for fluid coupling from the second end 244 of the heat transfer medium 240 to an inlet of the quench exchanger 130 may not be heated. In embodiments, the hydrocarbon-containing stream 210 enters the channels 246 of the heat transfer medium 240 at the first end face 242 and travels through the channels 246 of the heat transfer medium 240 to the second end face 244 of the heat transfer material 240.

According to embodiments, the heat transfer medium 240 is formed from a material that is not electrically conductive, and the heat transfer medium 240 is capable of functioning at the operating conditions of the pressure containment vessel 120. Furthermore, the heat transfer medium 240 is formed from a material that is not chemically reactive unless intended to be chemically reactive for a catalytic purpose. Specifically, the heat transfer medium 240 may not produce catalytic coke, which can extend the lifetime of the reactor system. In some embodiments, the heat transfer medium 240 may be cylindrical, square, rectangular, spherical, or pyramidal, although the geometry of the heat transfer medium 240 is not limited. The heat transfer medium 240 may be any shape through which the hydrocarbon-containing stream may flow. In some embodiments, the heat transfer medium 240 comprises at least one of ceramic and/or metal. The heat transfer medium 240 comprises materials that do not melt or deform under the temperature and pressure of the reaction conditions. That is, the heat transfer medium 240 may operate at a temperature ranging from 300° C. to 450° C., or from 600° C. to 1200° C., such as from 800° C. to 1000° C., from 850° C. to 950° C., or from 825° C. to 900° C.; and a pressure of at least 1 bar (100 kPa), such as at least 2 bar (200 kPa), or at least 3 bar (300 kPa). In other embodiments, the pressure may at least 10 bar (1000 kPa), at least 15 bar (1500 kPa), at least 25 bar (2500 kPa), at least 30 bar (3000 kPa), at least 40 bar (4000 kPa), or at least 50 bar (5000 kPa). In some embodiments, the heat transfer medium 240 may operate at a pressure of from 0.5 to 3 bar, from 1 to 3 bar, from 2 to 3 bar, from 0.5 to 2 bar, from 1 to 2 bar, or from 0.5 to 1 bar. Furthermore, in some embodiments, the heat transfer medium 240 may include at least one of silicon carbide, graphite, and aluminum. In some embodiments, the heat transfer medium 240 may not include any or high degrees of nickel or chromium.

The heat transfer medium 240 may, in embodiments, be removably positioned in the pressure containment vessel 120. As used throughout this disclosure, the term "removably positioned" refers to the removability of a system component from its placement within the system. Specifically, as this relates to the heat transfer medium 240, the heat transfer medium 240 may be positioned within the pressure containment vessel 120 and may be removed from this position, placed in an alternative position within the pressure containment vessel 120, or removed from the pressure containment vessel 120 without damaging either the pressure containment vessel 120 or the heat transfer medium 240. The heat transfer medium 240 may further comprise an electrical resistor, an electrical lead line that is removably coupled to a source of electrical current, and an electrical insulator. As used throughout this disclosure, the term "removably coupled" refers to the removability of a system component from its coupling within the system without damaging either of the coupled components. Specifically, as this relates to the electrical lead line, the electrical lead line may be coupled to a source of electrical current, and may be removed from this coupling, meaning that the electrical lead line may no longer be coupled to a source of electrical current.

As discussed above, the heat transfer medium 240 may further comprise one or more electrical circuits, an electrical resistor, an electrical lead line, and an electrical insulator. The one or more electrical circuits may comprise one or more electrodes. An electrode is an electrical conductor used to make contact with a nonmetallic part of a circuit. The electrical circuits may conduct electrical current through the heat transfer medium 240. The nonmetallic part of a circuit may, in embodiments include the heat transfer medium 240. The electrodes may be provided on the surface of the heat transfer medium 240, incorporated into the heat transfer medium 240, or be dispersed throughout the heat transfer medium 240, as nonlimiting examples. The surface of the heat transfer medium 240 may include the first end face 242 and the second end face 244 of the heat transfer medium 240. An electrical lead line is an electrical coupling mechanism consisting of a length of wire or a metal pad that is designed to electrically couple two locations or apparatuses.

An electrical insulator is a material whose internal electric charges do not flow freely; very little electric current will flow through it under the influence of an electric field. The property that distinguishes an electrical insulator from other materials, such as conductors and semiconductors, is their electrical resistivity; insulators have higher resistivity than semiconductors or conductors. Nonlimiting examples of electrical insulators may include glass or ceramic. In embodiments, glass or ceramics that can withstand operating conditions in the heat transfer medium 240 may be used as electrical insulators. Furthermore, the electrical insulators may be gas tight, meaning that gas may not leak from the heat transfer medium 240 through the electrical insulators.

Resistors precisely control the amount of resistance in an electrical circuit; providing more control over resistivity than insulators. In embodiments, a resistor is a passive two-terminal electrical component that implements electrical resistance as a circuit element. As nonlimiting examples, resistors may be used to reduce current flow and to divide voltages, thereby generating heat from the electrical current in a controlled fashion. Accordingly, resistors may be used to convert electrical current to heat. Fixed resistors have resistances that only change slightly with temperature, time, or operating voltage. The electrical resistors may include a resistor specifically selected for specific electrical resistance with the intent of generating heat. Electrical resistors may be provided on the surface of the heat transfer medium 240, incorporated into the heat transfer medium 240, or be dispersed throughout the heat transfer medium 240, as nonlimiting examples. Thus, in one or more embodiments, electrical current is introduced to the heat transfer medium, and the electrical current is converted to heat by the resistors, thereby heating the heat transfer medium and, in turn, heating the channels within the heat transfer medium. In some embodiments, such as, but not limited to, when the heat transfer material comprises graphite, the heat transfer material may further serve as a resistor.

In some embodiments, the electrical insulator may be provided between the electrical resistors and the interior chamber of the pressure containment vessel 120, such that greater electrical current than needed for reaction conditions may not be converted to heat by the electrical resistors and may be contained within the heat transfer medium 240 and not dissipate into the interior chamber of the pressure containment vessel 120. Specifically, the electrical insulator may be used to contain the electricity within the heat transfer medium 240, thereby preventing other components of the system 100 from conducting the electrical current. The insulator material has high enough electrical resistance to avoid heat generation. The electrical insulator transfers electrical current through the wall of the pressure containing equipment and couples to the heat transfer medium. The heat within the heat transfer medium may 240 may be transferred to the quench exchanger 130 via the effluent stream 220.

As disclosed previously, the heat created by the conversion of electrical current to heat by the electrical resistors may be contained within the heat transfer medium 240 and may not dissipate into the interior chamber of the pressure containment vessel 120. However, in some embodiments, thermal radiation and other secondary thermal effects may cause some heat to dissipate into the interior chamber of the pressure containment vessel 120 due to convection flow. To prevent heat from dissipating into the interior chamber of the pressure containment vessel 120, the pressure containment vessel 120 may be lined inside with a thermal insulation material to minimize heat loss and to minimize heat transfer from the heat transfer medium 240 to the pressure containment vessel 120. This thermal insulation material may be a refractory material, such as, but not limited to, andalusite, mulcoa, molochite, chamottes, clay, fused silica, high alumina, metakaolin, and bentonite. In some embodiments, the thermal insulation material may act as a barrier between the outer walls of the pressure containment vessel 120 and the heat transfer material 240.

In some embodiments, the reactor system is coupled to a source of electrical current that provides electrical current to the heat transfer medium 240 via the electrical lead lines. The electrical lead lines transfer the electrical current from the source of electrical current to the heat transfer medium 240 disposed within the pressure containment vessel 120 via an electrical coupling with both the source of electrical current and the heat transfer medium 240. In various embodiments, the source of electrical current may be a renewable energy source, leading to no $CO_2$ emissions. The source of electrical current may, in embodiments, be a battery, solar power, nuclear power, wind energy, steam energy, natural gas, hydroelectric power, coal, or the like. The electrical current may be decreased or increased outside of the system 100. In some embodiments, the electrical current may be actively controlled, turned on and off, and decreased or increased to control the heat generated in the heat transfer medium 240. Furthermore, in some embodiments, there may be more than one electrical currents through the heat transfer medium 240. These one or more currents may control one or more reaction zones within the heat transfer medium 240, thereby specifically generating heat in one or more reaction zones within the heat transfer medium 240. A reaction zone is a portion of the heat transfer medium 240 that is capable of creating reaction conditions as defined herein. In some embodiments, these one or more electrical currents may be actively controlled, and decreased or increased to control the heat generated in the one or more reaction zones in the heat transfer medium 240.

In some embodiments, the heat transfer medium 240 comprises one or more reaction zones. In some embodiments, the heat transfer medium 240 comprises at least two reaction zones. The at least two reaction zones may be in parallel or in series. Each of these at least two reaction zones independently receives electrical current that may be converted to heat. The voltage of the electrical current along with the specific amperes of the electrical current are indicative of the heat of the heat transfer medium 240. Specifically, the temperature of the heat transfer medium 240 during the process of converting the hydrocarbon-containing stream 210 may be determined from the values of the resistivity of the heat transfer medium 240 and the amperes of the electrical current that is converted to heat in the heat transfer medium 240. Joule's first law states that the power (P) of heating generated by an electrical conductor is proportional to the product of its resistance (R) and the square of the current (I), as shown by Equation 1:

$$P \propto I^2 R \tag{1}$$

Various zones of the heat transfer medium 240 may, according to embodiments, be designed to have differing resistivities, which may be taken into account when determining the desired heat of the heat transfer medium 240 within specific zones. This may be accomplished by providing different resistor materials and/or different quantities of resistor materials at the different zones of the heat transfer medium 240. Differing resistivities may lead to differing amounts of heat generation in various zones of the heat transfer medium 240. Differing amounts of heat generation in various zones of the heat transfer medium 240 may also be accomplished by varying the electrical current in the heat transfer medium 240.

In some embodiments, the heat transfer medium 210 further comprises a catalyst. The catalyst may comprise, according to embodiments, at least one of silver, iron oxide, molybdenum oxide, vanadium oxide, chromium oxide, nickel oxide, copper oxide, zirconium oxide, potassium carbonate, potassium oxide, titanium oxide, cadmium oxide, aluminum oxide, tin oxide, and/or platinum oxide.

According to embodiments, the pressure of the interior chamber of the pressure containment vessel 120 may be modified without heating any of the first end 250 of the pressure containment vessel 120, the second end 260 of the pressure containment vessel 120, the at least one side wall 230 of the pressure containment vessel 120, or the heat transfer medium 240. This is possible because the heat transfer medium 240 disposed within the pressure containment vessel 120 is not heated by the conventional use of combustion. The conventional reactor systems utilize combustion to create the reaction conditions necessary for thermally treating a hydrocarbon-containing stream 210. The combustion creates the elevated temperature and pressure required for upgrading a hydrocarbon containing stream, and the elevated pressure is provided within the reaction tubes, creating a pressure differential between the inside of the reaction tubes and the outside of the reaction tubes. Therefore, the materials of the reaction tubes for conventional reactor systems must be chosen from materials capable of withstanding the necessary pressure differential that this causes. Conversely, reactor systems and processes, according to embodiments provided herein, for thermally treating a hydrocarbon-containing stream 210 create the elevated temperature by converting electrical current to heat in the heat transfer medium 240, and the pressure within the pressure containment vessel is controlled, if necessary, through conventional processes known in the art. The reactor systems and processes, according to embodiments provided herein, do not create a pressure differential between the inside the heat transfer medium 240 and the outside the heat transfer medium 240. Instead, the interior chamber of the pressure containment vessel 120 is pressurized via conventional means, thereby pressuring the interior chamber and the heat transfer medium 240 and avoiding a pressure differential. Therefore, the heat transfer medium 240 need not withstand a pressure differential, unlike the reaction tubes of conventional systems and processes. For example, and not by way of limitation, conventional processes for increasing pressure may include pumping gas into the pressure containment vessel 120. The heat transfer medium 240 is heated through the conversion of electrical current to heat at the heat transfer medium 240, but this heating is conducted in the heat transfer medium 240, not throughout the entirety of the pressure containment vessel 120. Although, in embodiments, heat may be radiated from the heat transfer medium 240 to the atmosphere within the pressure containment vessel 120. That is, unlike the conventional systems which used combustion that increases both the pressure and temperature within the entire pressure containment vessel 120, the system and process of the present disclosure directly increases the temperature of the heat transfer medium 240 through conversion of electrical current to heat, which may indirectly increase the temperature of the entire pressure containment vessel 120 by dissipating heat from the heat transfer medium 240 to the atmosphere of the pressure containment vessel 120.

According to embodiments, one or more additional components may be included in the reactor system. In embodiments, such as shown in FIG. 1, a heat exchanger 110 may be fluidly coupled to an inlet of the pressure containment vessel 120. A quench exchanger 130 may be fluidly coupled to at least one of an outlet of the pressure containment vessel 120. In some embodiments, the quench exchanger 130 is fluidly coupled to all outlets of the pressure containment vessel 120. The quench exchanger 130 may function as a heat exchanger. A coolant drum 140 may be fluidly coupled to at least one of an outlet of the quench exchanger 130. The coolant drum 140 may be a steam drum as is known in the art. The coolant drum 140 is a cooling system in which coolant fluid is supplied from the coolant drum to at least one of the outlet of the quench exchanger 130. A steam water circulation loop may exist between the coolant drum 140 and the quench exchanger 130. Boiler feed water may be provided to the coolant drum 140 and steam generated from the coolant drum. In some embodiments, the quench exchanger 130 and the coolant drum 140 may be contained in one structure. A superheater 150 may be fluidly coupled to an outlet of the coolant drum 140. In some embodiments, the outlet of the coolant drum 140 may be a steam outlet. As nonlimiting examples, the superheater 150 may be an electrical superheater or a steam superheater. A second heat exchanger 160 may be thermally coupled to an inlet of the heat exchanger 110. The quench exchanger 130 may be fluidly coupled with the second heat exchanger 160.

According to one or more embodiments, a process for converting a hydrocarbon-containing stream 210 to desired products such as, for example, an effluent stream 220 comprising at least one of hydrogen, olefins, or aromatic hydrocarbons that uses the system 100 depicted in the embodiment of FIG. 1 will now be described. A hydrocarbon-containing stream 210 is introduced into the heat exchanger 110. It should be understood that the hydrocarbon-containing stream 210 may comprise at least one of methane, ethane, propane, butane, water ($H_2O$), and low levels of $CO_2$, CO, $N_2$, CO, $CO_2$, and $H_2$, according to various embodiments. In some embodiments, the hydrocarbon-containing stream 210 comprises $C_1$ to $C_5$ hydrocarbons. In other embodiments, the hydrocarbon-containing stream 210 comprises $C_1$ to $C_{20}$ hydrocarbons. In yet another embodiment, the hydrocarbon-containing stream 210 comprises $C_1$ to $C_{50}$ hydrocarbons.

The pressure containment vessel 120, according to embodiments, may use steam to convert the hydrocarbon-containing stream 210 to an effluent stream 220 comprising carbon monoxide (CO) and hydrogen through a steam methane reforming process in the heat transfer medium 240. For instance, according to one or more embodiments, the outlets of the channels 246 of the heat transfer medium 240 is at equilibrium for the following reactions: (1) $CH_4 + H_2O \rightarrow CO + 3H_2$; and (2) $CO + H_2O \rightarrow H_2 + CO_2$. Additionally, unreacted methane and water will be present at the outlets of the channels 246 of the heat transfer medium 240. In some embodiments, CO, $CO_2$, and $N_2$ may be present at the outlets of the channels 246 of the heat transfer medium 240. Furthermore, in some embodiments, a nickel-based catalyst may be present in this reaction. Although the temperature at which the heat transfer medium 240 is operated is not particularly limited so long as it can drive the above reactions, in one or more embodiments, the heat transfer medium 240 is operated at an inlet temperature from 400 degrees Celsius (° C.) to 450° C., such as from 415° C. to 435° C., or about 425° C. In some embodiments, the heat transfer medium 240 is operated at an inlet temperature of greater than 600° C., greater than 700° C., greater than 800° C., greater than 900° C., greater than 950° C., greater than 1000° C., greater than 1050° C., or up to 1100° C. Likewise, the pressure at which the pressure containment vessel 120 is operated is not particularly limited so long as it can drive the above reactions, in one or more embodiments, the pressure containment vessel 120 is operated at a pressure of 38 bar (3.8 MPa) to 46 bar (4.6 MPa), such as from 40 bar (4.0 MPa) to 44 bar (4.4 MPa), or about 42 bar (4.2 MPa). In embodiments, the feed into the heat transfer medium 240 may comprise from 30 wt. % methane to 40 wt. % methane, such as from 33 wt. % methane to 38 wt. % methane, or about 36 wt. % methane. Accordingly, in embodiments, the hydrocarbon-containing stream 210 into the heat transfer medium 240 may comprise from 60 wt. % water to 70 wt. % water, such as from 62 wt. % water to 67 wt. % water, or about 63 wt. % water.

The process for thermally treating a hydrocarbon-containing stream 210 comprises introducing the hydrocarbon-containing stream 210 into channels 246 of a heat transfer medium 240. The heat transfer medium 240 is positioned within an interior chamber of a pressure containment vessel 120. The process further comprises pressurizing the pressure containment vessel 120 and the heat transfer medium 240 without heating the pressure containment vessel 120 or the heat transfer medium 240. The channels 246 of the heat transfer medium 240 may be fluidly coupled to the interior chamber of the pressure containment vessel 120. This fluid coupling may allow the pressure containment vessel 120 and the channels 246 to pressurize. The process further comprises supplying electrical current to the heat transfer medium 240, converting the electrical current to heat, thereby increasing the temperature of the heat transfer medium 240 without directly heating the interior chamber of the pressure containment vessel 120, thereby heating the hydrocarbon-containing stream 210 within the channels 246 of the heat transfer medium 240. Lastly, the process comprises converting the hydrocarbon-containing stream 210 to an effluent stream 220 within the channels 246 of the heat transfer medium 240, and removing the effluent stream 220 from the channels 246 of the heat transfer medium 240. The fluid coupling from the second end 244 of the heat transfer medium 240 to an inlet of the quench exchanger 130 may be formed to allow laminar flow and equal residence time of the hydrocarbon-containing stream 210 in all channels 246 of the heat transfer medium 240. Although the figures show that the hydrocarbon-containing stream 210 and the effluent stream 220 enter and exit the pressure containment vessel 120 at different locations, it should be understood that the hydrocarbon-containing stream 210 and the effluent stream 220 may enter and exit the pressure containment vessel 120 at any location.

Converting the hydrocarbon-containing stream 210 to the effluent stream 220 may comprise increasing the temperature of the hydrocarbon-containing stream 210, thereby causing a chemical reaction that produces the effluent stream 220. The hydrocarbon-containing stream 210 may be contacted with the channels 246 of the heat transfer medium 240 under reaction conditions sufficient to form an effluent stream 220. The reaction conditions may comprise: a temperature ranging from 300° C. to 450° C., or from 600° C. to 1200° C., such as from 800° C. to 1000° C., or from 825° C. to 900° C.; and a pressure of at least 1 bar (100 kPa), such as at least 2 bar (200 kPa), or at least 3 bar (300 kPa). In other embodiments, the pressure may at least 10 bar (1000 kPa), at least 15 bar (1500 kPa), at least 25 bar (2500 kPa), at least 30 bar (3000 kPa), at least 40 bar (4000 kPa), or at least 50 bar (5000 kPa). In some embodiments, the heat transfer medium 240 is heated to a temperature of greater than 600° C., greater than 800° C., greater than 900° C., greater than 950° C., greater than 1000° C., greater than 1050° C., greater than 1100° C., greater than 1150° C., greater than 1200° C., or greater than 1500° C. The reactions that occur in in channels 246 of the heat transfer medium 240 produce an effluent stream 220. In some embodiments, the reactions that occur in the pressure containment vessel 120 further produce byproducts comprising one or more of CO, $CO_2$, $H_2$, $H_2O$, $CH_4$, $C_2H_6$, $C_2H_2$, $C_3H_6$, $C_3H_8$, and $C_3H_4$.

The effluent stream 220 comprises at least one of hydrogen, olefins, and aromatic hydrocarbons. In one or more embodiments, the effluent stream 220 consists essentially of or consists of at least one of hydrogen, olefins, and aromatic hydrocarbons. In embodiments, the olefins comprise $C_2$ to $C_5$ olefins such as, for example, ethylene ($C_2H_4$), propylene ($C_3H_6$), and butylene ($C_4H_8$). In other embodiments, the olefins comprise $C_2$ to $C_{10}$ olefins. The olefins may comprise $C_2$ to $C_{20}$ olefins. In yet another embodiment, the olefins may comprise $C_2$ to $C_{50}$ olefins. In some embodiments, the olefins may comprise diolefins, such as butadiene. The aromatic hydrocarbons may comprise benzene and derivatives thereof, such as toluene, ethylbenzene, o-xylene, p-xylene, m-xylene, mesitylene, durene, 2-phenylhexane, and biphenyl. The effluent stream 220 is collected and used in various other processes to make desired end products.

The process may further comprise preheating the hydrocarbon-containing stream 210 before introducing the hydrocarbon-containing stream 210 to the channels 246 of the heat transfer medium 240 by passing the hydrocarbon-containing stream 210 through a heat exchanger 110. The exit temperature of the heat exchanger 110 may be below the operating temperature of the channels 246 of the heat transfer medium 240. The second heat exchanger 160 can be used to remove heat from the effluent stream 220, wherein the heat removed from the effluent stream 220 can be used to preheat the hydrocarbon-containing stream 210. This may be an optional component to the systems and processes disclosed herein, as the hydrocarbon-containing stream 210 does not need to be preheated prior to introducing the hydrocarbon-containing stream 210 to the channels 246 of the heat transfer medium 240, when the hydrocarbon-containing stream 210 is a vapor stream. There may be one or more heat exchangers 110 and 160, which may be parallel and/or in series. The heat exchangers 110 and 160 may minimize the electrical energy consumption of the system 110.

In some embodiments, the process further comprises removing heat from the effluent stream 220 after removing the effluent stream 220 from the heat transfer medium 240 by passing the effluent stream 220 through a quench exchanger 130. The quench exchanger may cool the effluent stream 220 to below the reaction temperature. Cooling the effluent stream 220 below the reaction temperature prevents further reactions, or conversion, of the effluent stream 220. In some embodiments, the quench exchanger 130 cools to effluent stream 220 to below 1200° C., below 1000° C., below 800° C., below 600° C., or below 500° C. within 1000 milliseconds, 500 milliseconds, 200 milliseconds, 100 milliseconds, or 50 milliseconds. The quench exchanger 130 may operate at a similar or the same pressure as the pressure containment vessel 120. The process may further comprise passing a cold coolant stream 310 through a coolant drum 140 and then to the quench exchanger 130. The process may comprise cooling the effluent stream 220 in the quench exchanger 130 with the cold coolant stream 310. The process may then further comprise passing a hot coolant stream 320 from the quench exchanger 130 to the coolant drum 140. In some embodiments, the process further comprises passing the hot coolant stream 320 to a superheater 150. Passing the hot coolant stream 320 may increase the energy efficiency of the system 100 and maximize the available work contained in the steam. The process may then further comprise using the hot coolant stream 320 in other processes known in the art, such as, as a nonlimiting example, to drive a steam turbine. These are optional components to the systems and processes disclosed herein, as the effluent stream 220 may be cooled according to other methods known in the art. In some embodiments, the process may include passing the effluent stream 220 through a second heat exchanger 160, which may be thermally coupled with the heat exchanger 110. The second heat exchanger 160 may cool the effluent stream 220 and transfer heat from the effluent stream 220 to the heat exchanger 110 to heat the hydrocarbon-containing stream 210. There may be one or more second heat exchangers 160, which may be parallel and/or in series.

At least in part because they do not involve combusting gases within the interior chamber of the pressure containment vessel, embodiments of systems and processes for converting hydrocarbon-containing streams to desired products disclosed and described herein result in decreased coke production over known processes for converting a hydrocarbon containing stream into $C_2$ to $C_5$ hydrocarbons. Coke may form due to catalytic coke formation on the surface of the heat transfer medium 240 or the channels 246 of the heat transfer medium 240, or due to thermal coke formation in the bulk gas phase. Thermal coke that does not deposit on the surface of the heat transfer medium 240 or the channels 246 of the heat transfer medium 240 may continue flowing with the effluent stream 220 to components of the system 100 downstream of the heat transfer medium 240. However, if catalytic coke is present on the surface of the heat transfer medium 240 or the channels 246 of the heat transfer medium 240, it may capture thermal coke formed in the bulk gas phase, adding more coke to a layer of coke on the channels 246 of the heat transfer medium 240. The systems and processes herein reduce or eliminate catalytic coke formation on the heat transfer material 240 and may extend the period between decoking processes or eliminate the need for decoking processes altogether. For instance, in one or more embodiments, the process results in 25%, 50%, 60%, 70%, 75%, 80%, 85%, 90%, 95%, 99%, or 100% less coke production than conventional processes. In some embodiments, the process results in no catalytic coke production.

Additionally, in some embodiments, the systems and processes disclosed herein do not directly produce $CO_2$ emissions from the heating process. Specifically, the systems and processes herein utilize electrical heating systems and processes, which result in no direct $CO_2$ production from the heating systems and processes used to heat the heat transfer medium 240, as compared to conventional systems that utilize combustion reactions to generate heat. These combustion reaction systems and processes conventionally burn methane or other gases, which produces $CO_2$ that must be emitted from the system. By using systems that do not require combustion, $CO_2$ production can be reduced by millions of tons per year. It should be clear that although the effluent stream 220 may include $CO_2$, the systems and processes disclosed herein do not directly produce $CO_2$ emissions from the heating process.

It will be apparent to those skilled in the art that various modifications and variations can be made to the embodiments described herein without departing from the spirit and scope of the claimed subject matter. Thus it is intended that the specification cover the modifications and variations of the various embodiments described herein provided such modification and variations come within the scope of the appended claims and their equivalents.

The invention claimed is:

1. A reactor system for thermally treating a hydrocarbon-containing stream comprising:
    a pressure containment vessel comprising an interior chamber defined by a first end, a second end, and at least one side wall extending from the first end to the second end; and
    a heat transfer medium that converts electrical current to heat and is positioned within the interior chamber of the pressure containment vessel,
    wherein:
        the heat transfer medium comprises a first end face, a second end face, and channels extending between the first end face and the second end face,
        the heat transfer medium is fluidly coupled to the interior chamber, and the second end face is placed against the second end.

2. The system of claim 1, wherein the heat transfer medium comprises ceramic.

3. The system of claim 1, wherein a pressure of the interior chamber of the pressure containment vessel can be modified without heating any of the first end of the pressure containment vessel, the second end of the pressure containment vessel, the at least one side wall of the pressure containment vessel, and the heat transfer medium.

4. The system of claim 1, wherein the heat transfer medium is removably positioned in the pressure containment vessel and further comprises an electrical resistor, an electrical lead line that is removably coupled to a source of electrical current, and an electrical insulator.

5. The system of claim 1, wherein the reactor system further comprises at least one of:
    a heat exchanger fluidly coupled to an inlet of the pressure containment vessel;
    a quench exchanger fluidly coupled to an outlet of the pressure containment vessel;
    a coolant drum fluidly coupled to at least one of an outlet of the quench exchanger and an inlet of the quench exchanger; and
    a superheater fluidly coupled to an outlet of the coolant drum.

6. The system of claim 1, wherein the heat transfer medium comprises silicon carbide.

7. The system of claim 1, wherein:
    the heat transfer medium comprises ceramic;
    a pressure of the interior chamber of the pressure containment vessel can be modified without heating any of the first end of the pressure containment vessel, the second end of the pressure containment vessel, the at least one side wall of the pressure containment vessel, and the heat transfer medium;
    the heat transfer medium is removably positioned in the pressure containment vessel and further comprises an electrical resistor, an electrical lead line that is removably coupled to a source of electrical current, and an electrical insulator; and
    the reactor system further comprises at least one of:
        a heat exchanger fluidly coupled to an inlet of the pressure containment vessel,
        a quench exchanger fluidly coupled to an outlet of the pressure containment vessel, a coolant drum fluidly coupled to at least one of an outlet of the quench exchanger and an inlet of the quench exchanger, and a superheater fluidly coupled to an outlet of the coolant drum, a quench exchanger fluidly coupled to an outlet of the pressure containment vessel, a coolant drum fluidly coupled to at least one of an outlet of the quench exchanger and an inlet of the quench exchanger, and a superheater fluidly coupled to an outlet of the coolant drum.

8. A process for thermally treating a hydrocarbon-containing stream comprising:
introducing the hydrocarbon-containing stream into channels of a heat transfer medium, wherein the heat transfer medium is positioned within an interior chamber of a pressure containment vessel;
pressurizing the pressure containment vessel and the heat transfer medium without heating the pressure containment vessel or the heat transfer medium;
supplying electrical current to the heat transfer medium;
converting the electrical current to heat, thereby increasing a temperature of the heat transfer medium,
heating the hydrocarbon-containing stream within the channels of the heat transfer medium;
converting the hydrocarbon-containing stream to an effluent stream within the channels of the heat transfer medium, and
removing the effluent stream from the channels of the heat transfer medium; and
wherein:
the interior chamber is defined by a first end, a second end, and at least one side wall extending from the first end to the second end;
the heat transfer medium comprises a first end face, a second end face, and the channels;
the channels extend between the first end face and the second end face;
the heat transfer medium is fluidly coupled to the interior chamber; and
the second end face is placed against the second end.

9. The process of claim 8, wherein converting the hydrocarbon-containing stream to the effluent stream comprises increasing a temperature of the hydrocarbon-containing stream, thereby causing a chemical reaction that produces the effluent stream.

10. The process of claim 8, further comprising preheating the hydrocarbon-containing stream before introducing the hydrocarbon-containing stream to the channels of the heat transfer medium by passing the hydrocarbon-containing stream through a heat exchanger.

11. The process of claim 8, further comprising removing heat from the effluent stream after removing the effluent stream from the heat transfer medium by passing the effluent stream through a quench exchanger.

12. The process of claim 8, wherein the heat transfer medium is heated to a temperature of greater than 800° C.

13. The process of claim 8, wherein the heat transfer medium operates at a pressure of greater than 30 bar.

14. The process of claim 8, wherein the heat transfer medium operates at a pressure of from 0.5 to 3 bar.

15. The process of claim 8, wherein the effluent stream comprises at least one of hydrogen, olefins, and aromatic hydrocarbons.

16. The process of claim 8, wherein the hydrocarbon-containing stream comprises $C_1$ to $C_{10}$ hydrocarbons.

17. The process of claim 8, wherein the hydrocarbon-containing stream comprises $C_1$ to $C_{25}$ hydrocarbons.

18. The process of claim 8, wherein the heat transfer medium comprises ceramic.

19. The system of claim 8, wherein the heat transfer medium comprises silicon carbide.

20. The process of claim 8, wherein:
the heat transfer medium is heated to a temperature of greater than 800° C.; and
the heat transfer medium operates at a pressure of from 0.5 to 3 bar.

* * * * *